(12) United States Patent
Hoebel et al.

(10) Patent No.: US 9,513,099 B2
(45) Date of Patent: Dec. 6, 2016

(54) DEVICE AND METHOD FOR CHECKING THE WEAR OF ROLLER CHAINS

(71) Applicants: Glenn Hoebel, Schopp (DE); Reiner Bayer, Trippstadt (DE)

(72) Inventors: Glenn Hoebel, Schopp (DE); Reiner Bayer, Trippstadt (DE)

( * ) Notice: Subject to any disclaimer, the term of this patent is extended or adjusted under 35 U.S.C. 154(b) by 297 days.

(21) Appl. No.: 14/373,096

(22) PCT Filed: Jan. 21, 2013

(86) PCT No.: PCT/DE2013/100018
§ 371 (c)(1),
(2) Date: Oct. 15, 2014

(87) PCT Pub. No.: WO2013/107447
PCT Pub. Date: Jul. 25, 2013

(65) Prior Publication Data
US 2015/0040415 A1 Feb. 12, 2015

(30) Foreign Application Priority Data
Jan. 19, 2012 (DE) .................. 10 2012 100 436

(51) Int. Cl.
*G01B 3/46* (2006.01)
*G01B 5/02* (2006.01)
*G01B 5/16* (2006.01)

(52) U.S. Cl.
CPC . *G01B 3/46* (2013.01); *G01B 5/02* (2013.01); *G01B 5/16* (2013.01)

(58) Field of Classification Search
CPC .................... G01B 3/46; G01B 5/02
USPC .......................... 33/712, 1 BB, 784
See application file for complete search history.

(56) References Cited

U.S. PATENT DOCUMENTS 1,816,695 A * 7/1931 Pope .................. G01B 5/003
33/712
3,805,393 A * 4/1974 Lemelson ............... G01B 7/02
33/504
4,092,781 A  6/1978 Blake
(Continued)

FOREIGN PATENT DOCUMENTS

DE  91 10 896 U1  11/1991
DE  295 08 570 U1  9/1995
(Continued)

OTHER PUBLICATIONS

International Search Report of PCT/DE2013/100018, mailed Apr. 2, 2013.

*Primary Examiner* — Christopher Fulton
(74) *Attorney, Agent, or Firm* — Collard & Roe, P.C.

(57) ABSTRACT

A device and method of checking wear on roller chains enables a quantitative statement to be made about the state of wear of a fitted roller chain. A device for tensioning a portion of the roller chain with a defined measuring load and a device for measuring the spacing between a given number of chain links are provided, the device for measuring the spacing having two contact pins, each of which is configured for positioning between two rivet heads or on a rivet head of a link plate, and a device for measuring and displaying the distance between the two contact pins. An accurate, quantitative measurement of the wear on a roller chain in the fitted state is obtained quickly and easily.

11 Claims, 5 Drawing Sheets

(56) References Cited

U.S. PATENT DOCUMENTS

| | | | | |
|---|---|---|---|---|
| 4,150,488 | A | * | 4/1979 | Behnke .................... G01B 3/38 33/567 |
| 4,151,652 | A | | 5/1979 | Palma |
| 4,437,241 | A | * | 3/1984 | Lemelson ................ G01B 3/18 33/818 |
| 5,003,913 | A | * | 4/1991 | Jensen .................... F16G 13/02 116/200 |
| 6,098,301 | A | * | 8/2000 | Kapphahn ................ G01B 3/04 33/492 |
| 6,178,824 | B1 | * | 1/2001 | Hayakawa .............. F16G 13/00 73/828 |
| 6,912,478 | B1 | * | 6/2005 | Face, III .................. G01C 7/04 33/523 |
| 7,984,565 | B2 | * | 7/2011 | Wu ........................ G01B 3/205 116/208 |
| 8,844,153 | B2 | * | 9/2014 | Hayashida .............. G01B 3/18 33/819 |
| 2009/0093910 | A1 | * | 4/2009 | Grosz .................... G01B 3/002 700/275 |
| 2010/0162583 | A1 | | 7/2010 | Wu |

FOREIGN PATENT DOCUMENTS

| | | |
|---|---|---|
| DE | 298 17 329 U1 | 2/2000 |
| GB | 2 396 420 A | 6/2004 |

* cited by examiner

Fig. 2

DEVICE AND METHOD FOR CHECKING THE WEAR OF ROLLER CHAINS

CROSS REFERENCE TO RELATED APPLICATIONS

This application is the National Stage of PCT/DE2013/100018 filed on Jan. 21, 2013, which claims priority under 35 U.S.C. §119 of German Application No. 10 2012 100 436.6 filed on Jan. 19, 2012, the disclosure of which is incorporated by reference. The international application under PCT article 21(2) was not published in English.

BACKGROUND OF THE INVENTION

1. Field of the Invention

The invention relates to a device and method of checking wear on roller chains, means being provided for tensioning a portion of the roller chain with a defined measuring load and means being provided for measuring the spacing between a given number of chain links.

2. Description of the Related Art

A gauge for measuring the spacing between two rivet heads of a chain is known from the U.S. Pat. No. 4,151,652 A and involves measuring the distance from the centre of one rivet head to the centre of the next rivet head. A defined measuring load cannot be transferred to the chain with this device. This measurement is hardly possible with a fitted chain and is fairly inaccurate even if the chain has been removed.

The DE 91 10 896 U1 describes a device for determining wear on roller chains, which consists of a rigid frame provided on one long side with two projections designed for insertion into the spaces delimited by the chain links. One of these projections is a rigid roller-support projection and the other is a measuring projection. The distance between the two projections is preferably a multiple of the length of a chain link. The device is configured as an integrally manufactured limit gauge. The measuring projection is also rigid, and the distance between the two projections is dimensioned according to a pre-selected elongation of the roller chain. A defined measuring load cannot be transferred to the chain with this device, either. It is also disadvantageous insofar as it is awkward to manufacture and can only be used for lightweight chains, such as bicycle chains. Furthermore, it is only possible to determine whether a chain is still serviceable or already too severely worn.

The DE 295 08 570 UI and the GB 2 396 420 A describe similar devices for measuring wear on roller chains, comprising a frame with a measuring projection, which has scale markings, and a roller-support projection. Although a numerical value is obtained with this device, the measurement is inaccurate. Plus, it is again impossible to transfer a defined measuring load to the chain with this device.

A device for determining wear on roller chains is known from the DE 298 17 329 UI, which consists of a frame provided on one long side with two projections designed to fit into the spaces delimited by the chain links. One of these projections is a rigid roller-support projection and the other a measuring projection. The distance between them is a multiple of the length of a chain link and/or corresponds to a pre-selected elongation or extension of the roller chain. The frame is formed by two jointed parts. If the parts form a straight line when the device is fitted against the chain, this indicates that the chain is worn. Here too, it is only possible to determine whether a chain is still serviceable or already too severely worn. It is not possible to transfer a defined measuring load to the chain with this device.

The U.S. Pat. No. 4,092,781 describes a device for measuring roller-chain elongation caused by wear. The chain is tensioned between two arms of the device by means of a spring and the spacing between a given number of chain links in a reference chain compared with the corresponding spacing in the chain under test. The result is inaccurate. A further disadvantage here is the need for a reference chain. A defined measuring load cannot be transferred to the chain with this device, either. A similar solution is known from the US 2010/162583 A1.

SUMMARY OF THE INVENTION

The object of the invention consists in providing a device for checking wear on roller chains, which permits a quantitative statement about the extent of wear and with which the measurement can be performed on a fitted chain.

This object is established according to the invention in that the device consists of two different tools, the one tool comprising means for tensioning a portion of the roller chain with a defined measuring load and the other tool comprising means for measuring the spacing between a given number of chain links, the means for tensioning a portion of the roller chain comprising two pins, each of which can engage a chain opening, and a frame that connects the two pins, the distance between the pins being variable, and the means for measuring the spacing having two contact pins, each of which is configured for positioning between two rivet heads on a link plate in that a circular area of each contact pin can be placed between and in contact with two rivet heads, and including a measuring device for measuring and displaying the distance between the two contact pins.

In an alternative embodiment of the invention, the object is established in that the device consists of two different tools, the one tool comprising means for tensioning a portion of the roller chain with a defined measuring load and the other tool comprising means for measuring the spacing between a given number of chain links, the means for tensioning a portion of the roller chain comprising two pins, each of which can engage a chain opening, and a frame that connects the two pins, the distance between the pins being variable, and the means for measuring the spacing having two contact pins, each of which is configured for positioning on the rivet head of a link plate in that the contact pins each have a v-shaped incision that can be centered on one of the rivet heads, and including a measuring device for measuring and displaying the distance between the two contact pins.

The invention is based on the finding that is expedient, using two different tools, firstly to tension an accessible portion of the chain with a defined measuring load and secondly, to measure the spacing between a given number of chain links (e.g. 20 chain links) within this tensioned portion. Only by separating the tensioning process from the measuring process is an accurate and reproducible measuring result obtained. In addition, unlike the prior art, the measurement is not performed on the upper or lower side of the roller chain by engaging the measuring device in the spaces in the roller chain but laterally, at the link plates, and, there, between two rivet heads in each case. It was found within the framework of the invention that the position and shape of the rivet heads permits highly reproducible measurement. The two contact pins are applied, each on a link plate, between two rivet heads and thus on a planar contact surface. If no planar surface is available, the contact surface of the contact pin may be configured as a v-shaped contact surface for fixation on the rivet head. Handling errors can be avoided and highly reproducible results obtained by virtue of the fact that the contact pins are placed between the two rivet heads. The advantages of the invention consist essentially in that it enables an accurate, quantitative measurement of the wear on a roller chain in the fitted state to be obtained quickly and easily.

The distance between the pins can be varied in line with the specified measuring load. It may be possible for the measuring load applied to the roller chain in each case to be read off a marking.

A preferred embodiment of the invention consists in that the means for measuring the spacing between a given number of chain links is engineered as a distance gauge with a variable distance between the two contact pins.

It is to advantage in this connection that the distance gauge is a digital distance gauge.

The invention furthermore provides for the device to include storage means for storing the measured values.

These storage means may be contained internally within the measuring device, for example in the form of a memory chip, or else the device may have a connection to an external memory device, for example a computer, in which the measuring results are then evaluated.

It is to advantage that the free ends of the contact pins are magnetic.

This enables the contact pins simply to be placed on the link plates without the pins having to be held.

A useful refinement of the invention consists in that a calibration gauge is provided for setting the means for measuring the spacing to a reference value that corresponds to the spacing between the given number of chain links in a new roller chain.

This calibration gauge can be used with the means for measuring the spacing to set the zero value of the measurement.

The scope of the invention also includes a method of checking wear on roller chains, which involves the following steps:
 a) Tensioning a portion of the roller chain with a defined measuring load by means of a first tool having tensioning means provided with two pins, each of which engages a chain opening and whose distance apart is adjusted until the roller chain is tensioned;
 b) Arranging each of two contact pins, included in a second tool having means for measuring the spacing between a given number of chain links, between two rivet heads on a link plate within the tensioned portion of the roller chain by placing a circular area of each contact pin between and in contact with two rivet heads;
 c) Measuring the spacing between a given number of chain links with the second tool having means for measuring the spacing.

An alternative method, according to the invention, of checking wear on roller chains involves the following steps:
 a) Tensioning a portion of the roller chain with a defined measuring load by means of a first tool having tensioning means provided with two pins, each of which engages a chain opening and whose distance apart is adjusted until the roller chain is tensioned;
 b) Arranging each of two contact pins, included in a second tool having means for measuring the spacing between a given number of chain links, on a rivet head of a link plate within the tensioned portion of the roller chain by centering a v-shaped incision in the contact pin on one of the rivet heads;
 c) Measuring the spacing between a given number of chain links with the second tool having means for measuring the spacing.

A preferred refinement of the two methods consists in that, prior to step b), the means for measuring the spacing between a given number of chain links is calibrated to a reference value with a calibration gauge.

The measuring result is then the elongation of the chain compared to the reference value, which corresponds to the spacing between the given number of chain links in a new roller chain.

Finally, it is possible for the means for measuring the distance to generate an optical or acoustic signal if the spacing between the given number of chain links reaches a critical value.

BRIEF DESCRIPTION OF THE DRAWINGS

An embodiment of the invention is explained below in more detail by reference to drawings.

The drawing in

FIG. 3a to FIG. 3c are detailed views showing how the means for measuring the spacing is applied to the link plates of the roller chain;

DETAILED DESCRIPTION OF THE PREFERRED EMBODIMENTS

Figure 1:
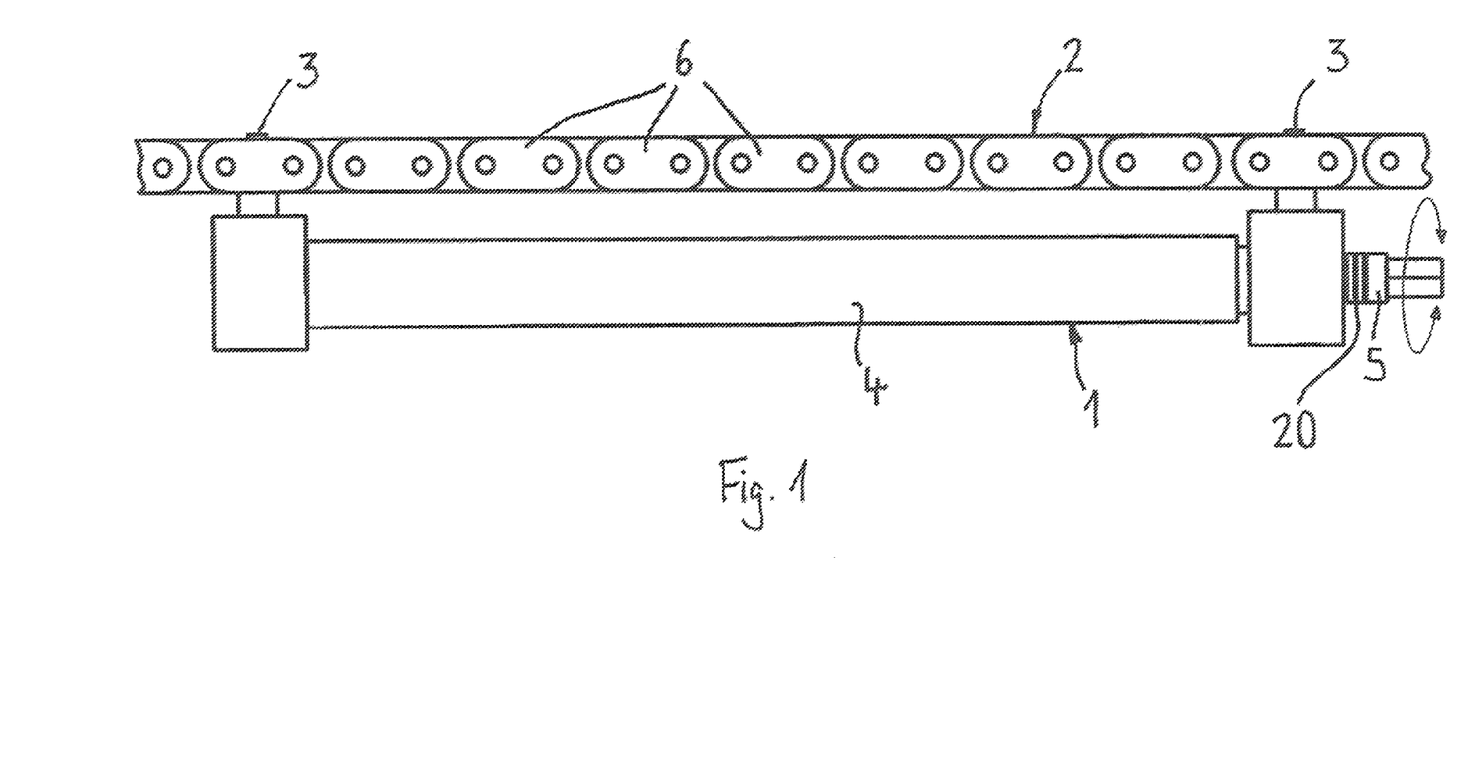
FIG. 1 shows the means for tensioning a portion of the chain.

FIG. 1 shows the means 1 for tensioning a portion of the roller chain 2 with a defined measuring load, the tensioning means 1 having two pins 3, each of which can engage a chain opening, and a frame 4 connecting the two pins 3. The distance between the pins 3 is variable. In the example illustrated, the distance between the pins 3—and thus the measuring load applied to the roller chain 2—can be varied by rotating the adjusting member 5. The means 1 for tensioning a portion of the roller chain 2 can tension variously sized portions of the roller chain 2, the size depending on the maximum distance between the pins 3. It has proved advantageous if the portion includes approx. 20 chain links 6. It is useful that the measuring load applied to the roller chain in each case can be read off a marking 20.

Figure 2:
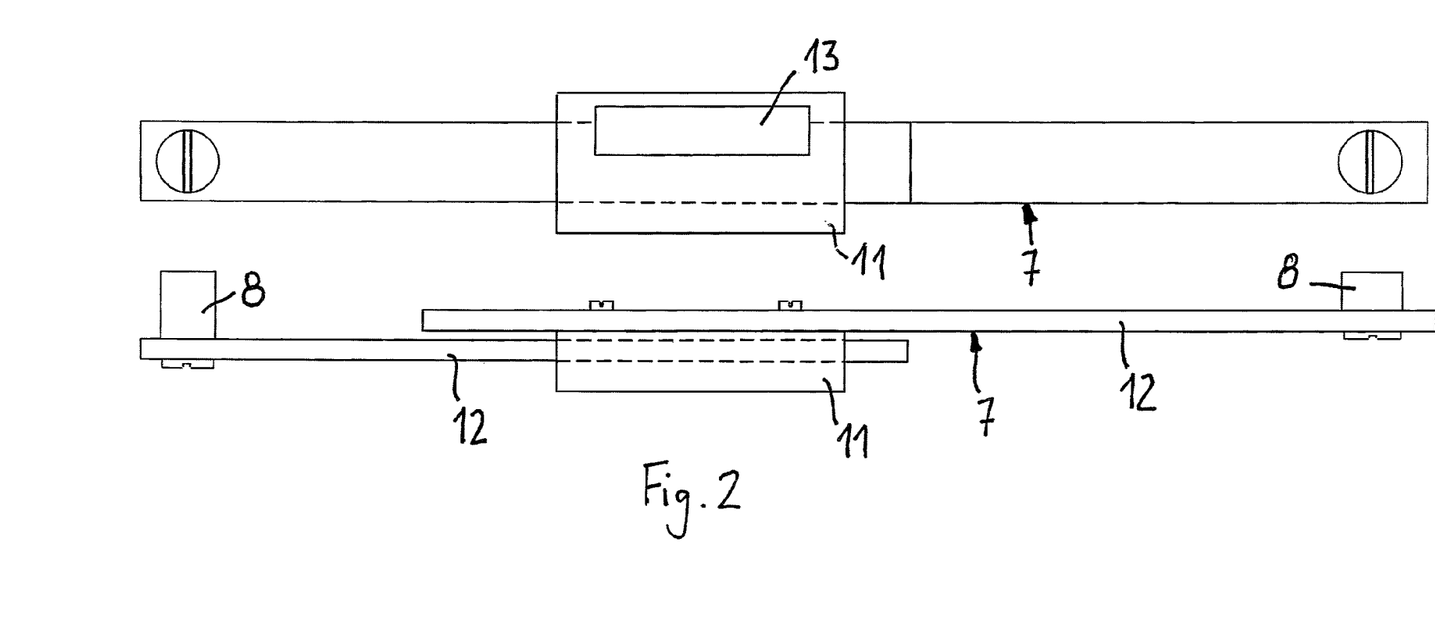
FIG. 2 shows a first embodiment of the means for measuring the spacing between a given number of chain links.

Once a portion of the roller chain 2 has been tensioned with a defined measuring load, the spacing between a given number of chain links 6 within the tensioned portion is determined with the means 7, shown in FIG. 2, for measuring the spacing between a given number of chain links 6. The means 7 for measuring the spacing has two preferably magnetic contact pins 8, each of which is configured to be positioned between two rivet heads 9 on an outer link plate 10. A device 11 for measuring and displaying the distance between the two contact pins 8 is also provided. In the embodiment illustrated, the means 7 for measuring the spacing between a given number of chain links 6 includes two mutually parallel rods 12. The measuring and display device 11, which is arranged on one of the rods 12, measures how far the other rod 12, which is pushed through the measuring device 11, is pulled out or pushed in. The respective measured value is displayed digitally on a display device 13.

Figure 3A:
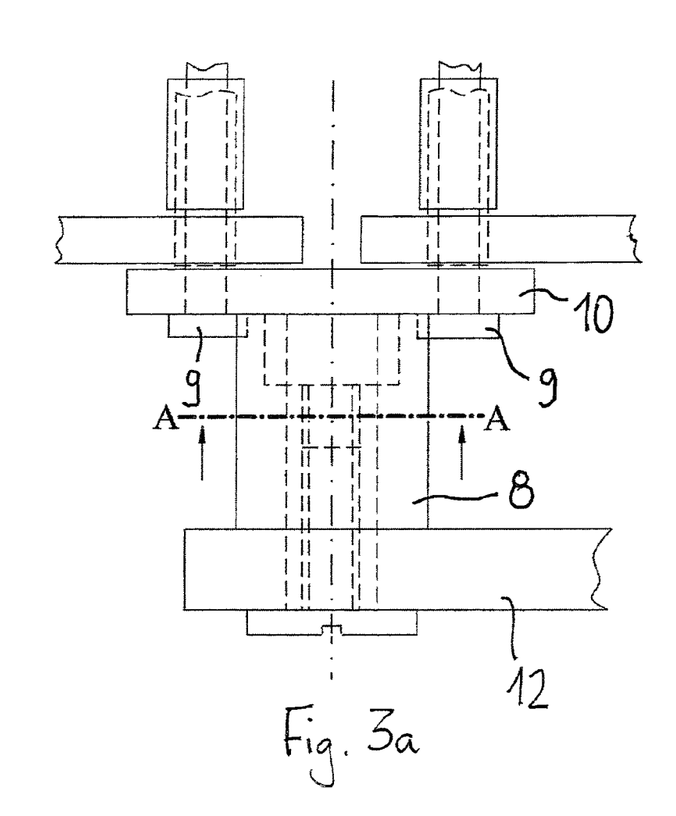
Figure 3B:
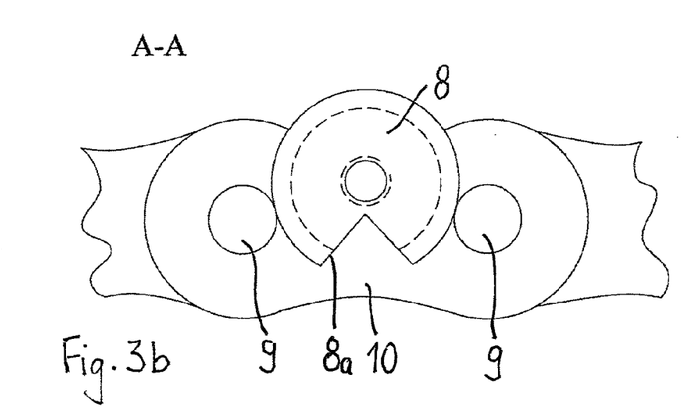
Figure 3C:
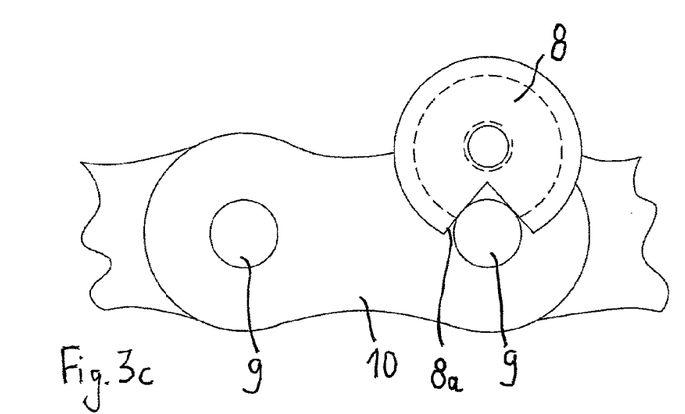

FIG. 3a shows details of how the means 7 for measuring the spacing between a given number of chain links 6 is positioned on a link plate 10 in the tensioned portion of the roller chain 2. Each of the two contact pins 8 is arranged between two rivet heads 9 on a link plate 10. On account of the contact pins 8 being magnetic, the means 7 for measuring the spacing between the two contact pins 8 is held in this position. The distance between the two contact pins 8 (and thus between the two chain links 6, on which the measurement is performed) can now be read off the display device 13. Preferably, the measurement is performed over a fairly large number of chain links, for example over 20 chain links. FIGS. 3b and 3c, which are cut views along the line A-A of FIG. 3a, show a preferred embodiment of the contact pins 8. This contact pin 8 is engineered to be circular and has a v-shaped incision 8a. This configuration makes it possible to measure the spacing between two chain links 6 either by placing the circular part of the contact pin 8 between two rivet heads 9 on a link plate (FIG. 3b) or to centre the contact pin 8 with its v-shaped incision 8a on one of the rivet heads 9 (FIG. 3c). In the latter case, it is important to place the v-shaped incision 8a of each contact pin on the same rivet head 9 of the forward and rearward link plates 10 (here: on the right-hand rivet head 9 in each case).

Figure 4:
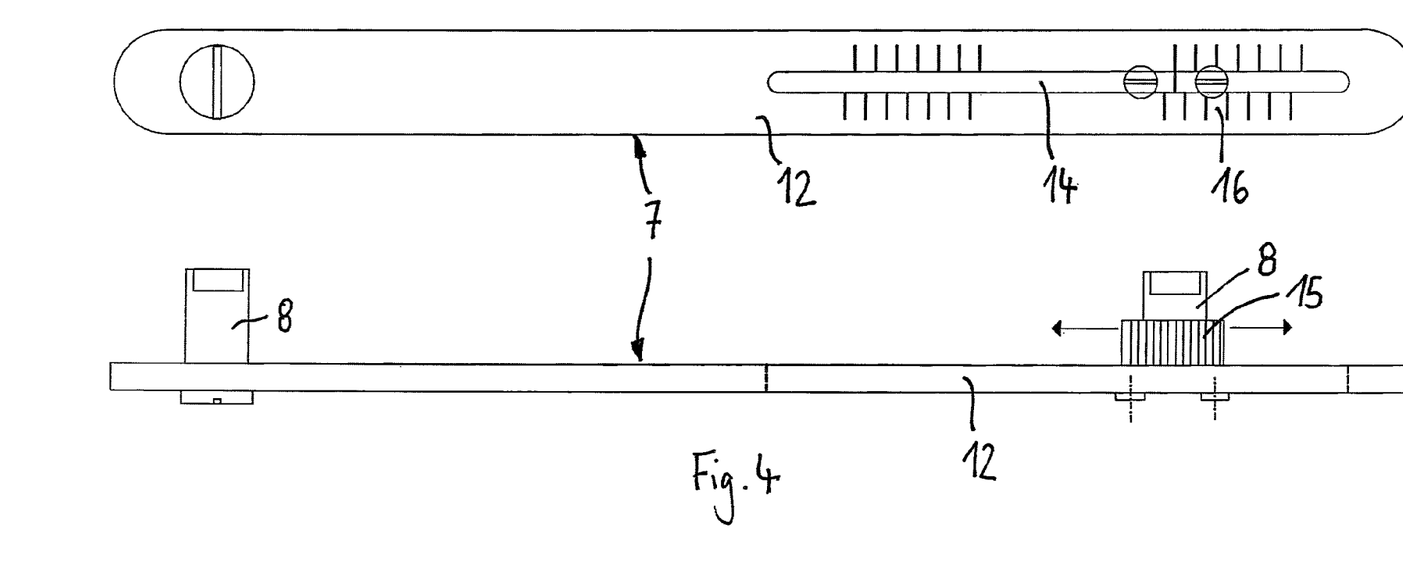
FIG. 4 shows a second embodiment of the means for measuring the spacing between a given number of chain links.

FIG. 4 shows another embodiment of the means 7 for measuring the spacing between a given number of chain links 6. Here, a rod 12 having a fixed contact pin 8 and a contact pin 8 that is movable within a slot 14 is provided. The movable contact pin 8 can be fixed in position by a locking device 15. Once both contact pins 8 have been positioned as desired, the distance between the contact pins 8 can be read off from a scale 16.

Figure 5:
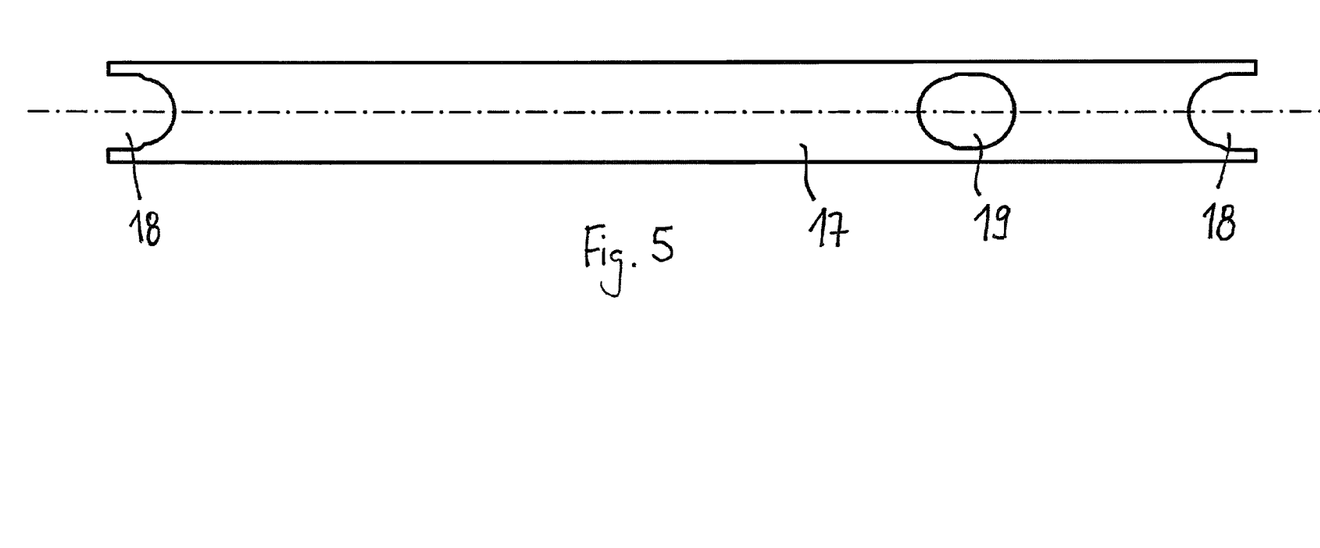
FIG. 5 shows a calibration gauge for the means for measuring the spacing.

In FIG. 5, ultimately, a calibration gauge 17 for the means 7 for measuring the spacing between a given number of chain links 6 is illustrated. Depending on the roller chain under test, one of the contact pins 8 is inserted into the semi-circular opening 18 at the one free end of the calibration gauge 17, the other contact pin 8 into the semi-circular opening 18 at the other free end of the calibration gauge 17 or into an opening 19 in the calibration gauge 17. The distance between the contact pins 8 inserted into the calibration gauge 17 corresponds to the reference value, which corresponds to the spacing between the given number of chain links in a new roller chain 2.

It is then possible, prior to checking a roller chain 2, to calibrate the means 7 for measuring the spacing between a given number of chain links 6 to the appropriate reference value, e.g. by pressing a zero-value key of the display device 13. The display device 13 then shows the elongation of the roller chain 2 compared to the reference value, making it possible to determine whether this is still within the permissible range. If this is not the case, an optical or acoustic signal may be generated.

Of course, it is also possible to provide a connection in the area of the display device, enabling the display device 13 to be connected up to a computer, for example in order to store the measuring results.

The device is particularly suitable for checking wear on roller chains used for motorcycles and in industry, and furnished with sealing rings. Since, in the case of roller chains, spent lubricant behind defective sealing rings cannot be replenished subsequently from the exterior, the wear on chain pins with defective sealing rings is very high in comparison to that on chain pins with functionally intact sealing rings. The elongation in roller chains with sealing rings is accordingly not distributed linearly over all the chain pins, as in a chain without sealing rings, but over a few severely worn chain pins. The extent of wear in a chain with sealing rings is thus much less and therefore requires an accurate measuring system. The device according to the invention was developed with these facts in mind and enables motorcycle chains to be checked without removing the chain from the motorcycle and without removing chain covers. However, it is also suitable for other roller chains, for example those in machines.

The invention claimed is:

1. Device for checking wear on roller chains comprising different first and second tools, the first tool comprising means (1) for tensioning a portion of the roller chain (2) with a defined measuring load and the second tool comprising means (7) for measuring the spacing between a given number of chain links (6), the means (1) for tensioning a portion of the roller chain (2) comprising two pins (3), each of which can engage a chain opening, and a frame (4) connecting the two pins, the distance between the pins (3) being variable, and the means (7) for measuring the spacing having two contact pins (8), each of which is configured for positioning between two rivet heads (9) on a link plate (10) in that a circular area of each contact pin (8) can be placed between and in contact with two rivet heads (9), and including a device (11) for measuring and displaying the distance between the two contact pins (8).

2. Device according to claim 1, wherein the means (7) for measuring the spacing between a given number of chain links (6) is engineered as a distance gauge with a variable distance between the two contact pins (8).

3. Device according to claim 2, wherein the distance gauge is a digital distance gauge.

4. Device according to claim 3, wherein the device includes storage means for storing the measured values.

5. Device according to claim 1, wherein the free ends of the contact pins (8) are magnetic.

6. Device according to claim 1, wherein a calibration gauge (17) is provided for setting the means for measuring the spacing to a reference value that corresponds to the spacing between the given number of chain links (6) in a new roller chain (2).

7. Device for checking wear on roller chains comprising different first and second tools, the first tool comprising means (1) for tensioning a portion of the roller chain (2) with a defined measuring load and the second tool comprising means (7) for measuring the spacing between a given number of chain links (6), the means (1) for tensioning a portion of the roller chain (2) comprising two pins (3), each of which can engage a chain opening, and a frame (4) connecting the two pins, the distance between the pins (3) being variable, and the means (7) for measuring the spacing having two contact pins (8), each of which is configured for positioning on a rivet head (9) of a link plate (10) in that the contact pins (8) each have a v-shaped incision (8a) that can be centered on one of the rivet heads (9), and including a device (11) for measuring and displaying the distance between the two contact pins (8).

8. Method of checking wear on roller chains, comprising the following steps:
   a) Tensioning a portion of the roller chain (2) with a defined measuring load by means of a first tool having tensioning means (1) provided with two pins (3), each of which engages a chain opening and whose distance apart is adjusted until the roller chain (2) is tensioned;

b) Arranging each of two contact pins (8), included in a second tool having means (7) for measuring the spacing between a given number of chain links (6), between two rivet heads (9) on a link plate (10) within the tensioned portion of the roller chain (2) by placing a circular area of each contact pin (8) between and in contact with two rivet heads (9);

c) Measuring the spacing between a given number of chain links (6) with the second tool.

9. Method according to claim 8, wherein, prior to step b), the means (7) for measuring the spacing between a given number of chain links (6) is calibrated to a reference value with a calibration gauge (17).

10. Method according to claim 8, wherein the means (7) for measuring the spacing generates an optical or acoustic signal if the spacing between the given number of chain links (6) reaches a critical value.

11. Method of checking wear on roller chains, comprising the following steps:

a) Tensioning a portion of the roller chain (2) with a defined measuring load by means of a first tool having tensioning means (1) provided with two pins (3), each of which engages a chain opening and whose distance apart is adjusted until the roller chain (2) is tensioned;

b) Arranging each of two contact pins (8), included in a second tool having means (7) for measuring the spacing between a given number of chain links (6), on a rivet head (9) of a link plate (10) within the tensioned portion of the roller chain (2) by centering a v-shaped incision (8*a*) in the contact pin (8) on one of the rivet heads (9);

c) Measuring the spacing between a given number of chain links (6) with the second tool.

\* \* \* \* \*